United States Patent Office 3,586,659
Patented June 22, 1971

3,586,659
MOLDING COMPOSITIONS CONTAINING INORGANIC CROSSLINKS
Russell G. Hay, Gibsonia, and William J. Heilman, Allison Park, Pa., assignors to Gulf Research & Development Company, Pittsburgh, Pa.
No Drawing. Filed May 28, 1968, Ser. No. 732,531
Int. Cl. C08f 15/00
U.S. Cl. 260—78.5T                                    10 Claims

ABSTRACT OF THE DISCLOSURE

Molding compositions are provided which are curable to objects which contain inorganic crosslinks which do not crack on standing. The composition contains a mixture of a solid comminuted copolymer of an alpha olefin having from 3 to 20 carbon atoms per molecule and maleic anhydride, and a solid comminuted Group II–A metal oxide or hydroxide such as CaO or Ca(OH)$_2$.

---

This invention relates to a curable molding composition containing a copolymer of an alpha olefin and maleic anhydride and certain metal oxides or metal hydroxides.

It has been found that alpha olefin-maleic anhydride copolymers can be molded under pressure and increased temperatures, but the resulting molded compositions tend to crack on standing. It has now been found that the addition of certain solid metal oxides and metal hydroxides to the solid copolymers of alpha olefins and maleic anhydride results in a molding composition which on curing contains inorganic crosslinks and results in a molded object which does not crack on standing. The conditions of molding are such as to cause the solid alpha olefin-maleic anhydride copolymers to at least flow but are insufficient to melt the metal oxides or metal hydroxides employed. It was unexpected to find that the solid alpha olefin-maleic anhydride copolymers would react to form a crosslinked thermoset product by reaction with certain metal oxides or metal hydroxides under conditions wherein the metal oxides or metal hydroxides were solid.

In accordance with the invention, a curable molding composition is provided which comprises a mixture of a solid comminuted copolymer of an alpha olefin having from 3 to 20 carbon atoms per molecule and maleic anhydride and a solid comminuted Group II–A metal oxide or metal hydroxide where the stoichiometric ratio of the metal oxide or hydroxide to the solid copolymer is at least 0.5:1.

The solid polyanhydride can be prepared by the copolymerization of maleic anhydride with any alpha olefin by free radical means. Preferred are the alpha monoolefins represented by the general Formula I below:

Formula I $$\begin{array}{c} H\ H \\ |\ \ | \\ C=C-R \\ | \\ H \end{array}$$

where R is a phenyl radical or an alkyl radical having from 1 to about 18 carbon atoms, more preferably from 4 to 18 carbon atoms.

It is understood that the term "olefin" is meant to include mixtures of monoolefins such as those obtained by the thermal or catalytic cracking of petroleum stocks. While only one olefinic bond per molecule is present in the olefin, since more than one double bond per molecule promotes gel formulation and internal crosslinking, minor amounts of diolefins, on the order of two percent or less, can be tolerated.

Examples of olefin compounds or mixtures of olefins suitable for forming the solid polyanhydride components of the compositions of this invention include:

Ethylene; 1-propene; 1-decene; 1-butene; 1-undecene; 1-isobutylene; 1-hexene; 1-dodecene; 1-pentene; 1-tridecene; 1-heptene; 1-octene; 1-tetradecene; 1-octadecene; 1-nonadecene; styrene; 1-nonene; and mixtures thereof.

One possible structure of the copolymer of hexene-1 and maleic anhydride is as follows:

Formula II $$H-\left[-CH_2-CH\underset{\underset{CH_3}{(CH_2)_3}}{\ }-\underset{\underset{O}{C}\diagdown\overset{H}{\ }}{C}\underset{\underset{\ }{O}}{\ }\underset{\underset{O}{C}\diagup\overset{H}{\ }}{C}-\right]_n -H$$

wherein $n$ is from 2 to about 100, or higher, and preferably from 2 to about 30. The foregoing assumes no additional polymerization of like monomers, which of course can take place with suitable monomers and conditions. It is to be understood that either or both of the terminal groups in the foregoing formula may be derived from any components in the reaction mixture.

A more general empirical formula is as follows:

Formula III $$\left[\begin{array}{c} H\ H\ H\ \ \ \ \ H \\ |\ \ |\ \ |\ \ \ \ \ \ \ | \\ -C-C-C-\!-\!-C- \\ |\ \ |\ \ |\ \ \ \ \ \ \ | \\ H\ R\ C\diagdown\ \diagup C \\ \ \ \ \ \ \ \overset{\|}{O}\ \ O\ \ \overset{\|}{O} \end{array}\right]_n$$

wherein $n$ is an integer of from two to about 100 and R is as defined above.

The copolymerization can be conducted in any suitable manner. One suitable copolymerization procedure involves contacting the olefinic compound with the maleic anhydride in a suitable solvent in the presence of a free radical producing catalyst, such as a peroxide. The molar ratio of the mono-alpha olefin to maleic anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e. —80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g., or higher, but the preferred pressure is atmospheric.

The copolymers can be produced in any suitable solvent which at least partially dissolves both of the reaction components. Suitable solvents include, for example:

n-Pentane; tetrahydrofuran; methylene chloride; n-hexane; cyclohexane; diisopropyl ether; n-octane; n-propylacetate; carbon tetrachloride; toluene; ethylbenzene; methylcyclohexane; benzene; di-n-butylether; ethyl-n-butyrate; cumene; n-amylacetate; tetrachloroethylene; xylene; cyclohexanone; methylortholylether; anisole; bromobenzene; methylethylketone; acetone; and ethylbenzylether.

The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobisisobutyronitrile.

The molecular weight of the polyanhydride component of the compositions of this invention is not critical. The inherent viscosity (which is a measure of molecular weight) of five grams of the polyanhydride per deciliter of acetone at 77° F. can suitably be between about 0.4 and 3.0. Lower or higher values have been found to produce unsatisfactory molding compositions, although such resins may be useful for other purposes.

The metal oxides and hydroxides that can be used in the composition of this invention can be any of the Group II-A metal oxides or hydroxides. The metal oxides can be represented by the formula MeO while the metal hydroxides can be represented by the formula $Me(OH)_2$ where Me represents any metal from Group II-A including Be, Mg, Ca, Sr and Ba. Particularly preferred are the oxides and hydroxides of calcium, barium and magnesium.

It is important that the solid polyanhydride and solid metal oxides or hydroxides be in finely divided or comminuted form, i.e. powdered, and intimately admixed before curing. It is preferred to admix the solid components on a ball mill or similar mixing device. If the solid components of the admixture are not in finely divided form and are not intimately admixed, the metal oxide or hydroxide components will tend to agglomerate and form a grainy structure on curing with resulting inferior chemical and physical properties.

The amount of the metal oxide or hydroxide to employ should preferably be sufficient chemically to stoichiometrically react with the anhydride groups in the solid polyanhydride. By a stoichiometric ratio of 1:1 is meant one mole of the metal oxide or hydroxide per mole of anhydride in the copolymer. Thus, $Ca(OH)_2$ reacts with two moles of anhydride, one OH per anhydride group while CaO reacts with two moles of anhydride, i.e.

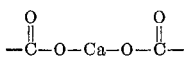

Thus, the stoichiometric ratio of the metal oxide or hydroxide to the solid polyanhydride can vary between 0.5:1 and 4:1 with preferred stoichiometric ratios being between 0.95:1 and 1.05:1. Amounts of the metal oxide or hydroxide in excess of a stoichiometric ratio of one do not chemically react but function as a filler and can be employed in this capacity if desired. Amounts of metal oxide or hydroxide less than a stoichiometric ratio of about 0.5 are undesirable as the physical properties of the final molded products are inferior.

The intimately admixed solid polyanhydride and metal oxide or hydroxide is molded by subjecting the solid admixture to increased temperatures and pressures for a time sufficient to enable the crosslinking reaction to occur. Suitable molding temperatures include those between room temperature and 250° C. The molding temperature should be at least the flow temperature of the solid polyanhydride. By the flow temperature is meant the temperature at which the copolymer will flow in the mold at the desired molding pressure. This temperature will vary depending on the copolymer and molding pressure employed, and anyone with ordinary skill in the art can easily and quickly determine the optimum molding temperature and pressure to employ. Preferred molding temperatures are between 150° and 200° C. Suitable molding pressures are those between 100 and 10,000 pounds per square inch or higher. High pressures serve no particular purpose but can be as high as 200,000 p.s.i. or more. The molding time is suitably between one and 60 minutes with usual molding times between 20 and 40 minutes.

It has been found that the cured molding compositions contain inorganic crosslinks formed by the reaction of the metal oxides or hydroxides with the anhydride functions of the polyanhydrides. A propylene-maleic anhydride copolymer crosslinked with calcium oxide would have a typical composition as shown below.

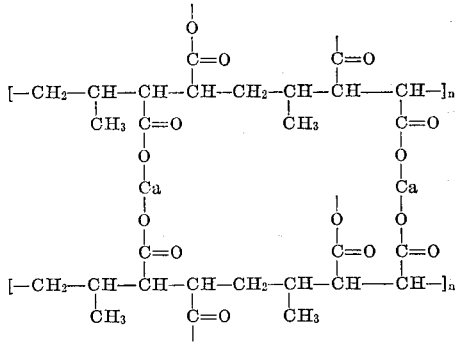

The cured molding compositions do not crack on standing are hard and possess solvent resistance properties. If softer, more wax-like molding compositions are desired higher carbon number alpha olefins, such as octadecene, should be employed in the production of the solid polyanhydrides.

The invention will be further described with reference to the following experimental work.

In many of the examples to follow the polyanhydride compound was prepared by the copolymerization of maleic anhydride with an alpha olefin having between 3 and 18 carbon atoms per molecule. These copolymers were prepared by reacting the desired olefin and maleic anhydride in a molar ratio of 2:1 in the liquid phase in the presence of a mutual solvent at a temperature between 60° and 100° C. using as a catalyst between two and three weight percent of benzoyl peroxide based on the maleic anhydride. The copolymer was then (1) separated from the solvent and any residual catalyst and (2) dried. Infrared analysis and nuclear magnetic resonance data show the alpha olefin and maleic anhydride combined in a 1:1 molar ratio. The inherent viscosities of the copolymers, measured by dissolving the copolymer in a ratio of five grams to a deciliter of acetone measured at 77° F. was between 0.45 and 0.65 as used in the examples below.

EXAMPLE 1

One hundred grams of a hexene-1-maleic anhydride copolymer having a dilute solution viscosity of 0.8 was ground to a finely comminuted form (powdered) and intimately admixed with 40.7 grams of a finely comminuted (powdered) solid calcium oxide on a ball mill. The stoichiometric ratio of the calcium oxide to the polyanhydride was 1:1. The solid intimate admixture was heated to 177° C. at a platen pressure of 5,000 p.s.i. for 30 minutes. The calcium oxide was now intimately chemically combined with the solid polyanhydride as demonstrated by the fact that the disk was found to be insoluble in benzene and water after several hours.

EXAMPLE 2

Example 1 was repeated except 100 grams of a propylene-maleic anhydride copolymer were used in place of the hexene-1-maleic anhydride copolymer and it was necessary to employ 51.87 grams of the calcium oxide to maintain the 1:1 stoichiometric ratio. In addition, the molding pressure was decreased to 2800 p.s.i. In this instance a sheet was formed rather than a disk so that hardness and tensile properties could be obtained. The cured molded sheet was found to have a tensile strength of 3460 p.s.i. and a Barcol hardness as determined by the Barcol 935 Impressor Test of 87.

A comparison of Examples 1 and 2 shows that the cured molded products produced using the molding compositions of this invention are hard when the low carbon number alpha olefins are employed and possess resistance to solvents on exposure.

EXAMPLE 3

Example 1 was repeated except 90 grams of an octadecene-1-maleic anhydride copolymer were employed in place of the hexene-1-maleic anhydride copolymer. The curing conditions were the same as in Example 1 except the pressure was reduced to 3500 p.s.i. The resulting white disk was soft and wax-like, resembling polyethylene in feel. The material was insoluble in water over a period of five days but benzene converted the disk to a gel.

A comparison of Examples 1 and 3 shows that if softer molded products are desired a higher carbon number alpha olefin, such as those having between 12 and 20 carbon atoms, should be employed.

EXAMPLE 4

In the run for this example, 18.2 grams of a hexene-1-maleic anhydride copolymer having a dilute solution viscosity of 0.8 was ground to a finely comminuted form (powdered) and intimately admixed with 7.4 grams of $Ca(OH)_2$ on a ball mill for 48 hours. The stoichiometric ratio of the calcium hydroxide to the polyanhydride was 1:1. The solid intimate admixture was heated to 82° C. at a platen pressure of 5,000 p.s.i. for 15 minutes. The calcium hydroxide was now intimately chemically combined with the solid polyanhydride as demonstrated by the fact that the disk was found to be insoluble in acetone and ethylene dichloride in 24 hours at room temperature. The Barcol 935 hardness was 70.

EXAMPLE 5

Example 4 was repeated except the stoichiometric ratio of the $Ca(OH)_2$ was increased to 2:1. Substantially the same results were obtained.

EXAMPLE 6

Example 1 was repeated except the molding temperature and time were 82° C. and 15 minutes respectively. The molded product was found to have a Barcol hardness of 60 and to be insoluble in acetone and ethylene dichloride over a period of 24 hours at room temperature.

A comparison of Examples 1–6 shows that the metal oxide or hydroxide can successfully be employed to crosslink the polyanhydride and produce molded compositions which are hard and possess solvent resistance characteristics.

Resort may be had to such variations and modifications as fall within the spirit of the invention and the scope of the appended claims.

We claim:

1. A molding composition curable to a thermoset product comprising an intimate admixture of a solid comminuted copolymer consisting essentially of an alpha-olefin having between 3 and 20 carbon atoms per molecule and maleic anhydride wherein the molar ratio of the alpha-olefin to the maleic anhydride is about 1:1 and wherein the inherent viscosity of the copolymer is from 0.4 to 3.0 and a solid comminuted Group II–A metal oxide or hydroxide where the stoichiometric ratio of the metal oxide or hydroxide to the solid copolymer is at least 0.5:1.

2. A molding composition in accordance with claim 1 where the metal hydroxide is calcium hydroxide.

3. A molding composition in accordance with claim 1 where the metal oxide is calcium oxide.

4. A composition according to claim 1 wherein the alpha olefin is hexene-1.

5. A composition according to claim 1 wherein the alpha-olefin has from 6 to 20 carbon atoms per molecule.

6. A composition according to claim 5 wherein the stoichiometric ratio of the metal oxide or hydroxide to the solid copolymer is from 0.5:1 to 4:1.

7. A composition according to claim 6 wherein the stoichiometric ratio of the metal oxide or hydroxide to the solid copolymer is from 0.95:1 to 1.05:1.

8. A composition according to claim 5 wherein the inherent viscosity of the copolymer is from 0.45 to 0.65.

9. A composition according to claim 1 wherein the alpha-olefin is propylene.

10. A composition according to claim 5 wherein the alpha-olefin is octadecene-1.

References Cited

UNITED STATES PATENTS

| | | | |
|---|---|---|---|
| 3,005,802 | 10/1961 | Sellers | 260—78.5 |
| 3,264,272 | 8/1966 | Rees | 260—78.5 |
| 3,272,771 | 9/1966 | Busche et al. | 260—41 |
| 3,404,134 | 10/1968 | Rees | 260—78.5 |
| 3,461,108 | 8/1969 | Heilman et al. | 260—78.5 |

JOSEPH L. SCHOFER, Primary Examiner

S. M. LEVIN, Assistant Examiner

U.S. Cl. X.R.

260—DIG 31